(12) United States Patent
Uotsu et al.

(10) Patent No.: US 7,555,324 B2
(45) Date of Patent: Jun. 30, 2009

(54) MOBILE TERMINAL

(75) Inventors: Shinichi Uotsu, Hitachinaka (JP); Masanobu Kumekawa, Higashiyamato (JP); Yutaka Chiba, Higashiyamato (JP)

(73) Assignee: Hitachi, Ltd., Tokyo (JP)

( * ) Notice: Subject to any disclaimer, the term of this patent is extended or adjusted under 35 U.S.C. 154(b) by 546 days.

(21) Appl. No.: 10/893,545

(22) Filed: Jul. 19, 2004

(65) Prior Publication Data
US 2005/0064903 A1 Mar. 24, 2005

(30) Foreign Application Priority Data
Sep. 19, 2003 (JP) .............................. 2003-327110

(51) Int. Cl.
*H04M 1/00* (2006.01)

(52) U.S. Cl. .............. 455/575.7; 455/556.1; 455/67.11; 455/343.1; 455/552.1; 455/553.1

(58) Field of Classification Search .............. 455/556.1, 455/575.7, 67.11, 557, 522, 553.1, 343.1–343.6, 455/572, 574, 140, 552.1
See application file for complete search history.

(56) References Cited

U.S. PATENT DOCUMENTS

| | | | | |
|---|---|---|---|---|
| 4,914,714 | A * | 4/1990 | Tamura | 455/78 |
| 5,913,153 | A * | 6/1999 | Nakamoto et al. | 455/78 |
| 6,023,615 | A * | 2/2000 | Bruckert et al. | 348/14.08 |
| 6,771,057 | B1 * | 8/2004 | Raddant | 324/76.26 |
| 7,024,168 | B1 * | 4/2006 | Gustafsson et al. | 455/135 |
| 7,031,723 | B2 * | 4/2006 | Shamoto et al. | 455/456.1 |
| 7,149,489 | B2 | 12/2006 | Hang | |
| 7,181,171 | B2 * | 2/2007 | Forrester | 455/82 |
| 2002/0002062 | A1 * | 1/2002 | Itazu et al. | 455/557 |
| 2002/0022501 | A1 * | 2/2002 | Sato | 455/557 |
| 2002/0081987 | A1 * | 6/2002 | Yoshida et al. | 455/277.1 |
| 2002/0107033 | A1 * | 8/2002 | Kim | 455/456 |

(Continued)

FOREIGN PATENT DOCUMENTS

CN 1429045 A 7/2003

(Continued)

OTHER PUBLICATIONS

Translation of Chinese Office Action for Application No. 200410071326X Mailed Sep. 22, 2006.

(Continued)

*Primary Examiner*—Edward Urban
*Assistant Examiner*—Fayyaz Alam
(74) *Attorney, Agent, or Firm*—McDermott Will & Emery LLP

(57) ABSTRACT

In a cell phone, no consideration is given to a switch unit when a reception circuit for space diversity is added, and consequently an antenna can be optimally connected to the reception circuit for space diversity. The cell phone comprises a first antenna for radio communication, a transmission-reception circuit to exchange signals with a base station through the first antenna, and a GPS reception circuit to receive signals from the GPS satellite through the first antenna. The reception circuit receives a signal from the base station, a second antenna different from the first antenna is provided, and the switch unit changes over connections between the first antenna and the second antenna, and the transmission-reception circuit, the GPS reception circuit and the reception circuit according to operation modes.

1 Claim, 7 Drawing Sheets

U.S. PATENT DOCUMENTS

| | | | |
|---|---|---|---|
| 2003/0017833 A1* | 1/2003 | Forrester | 455/456 |
| 2003/0043928 A1* | 3/2003 | Ling et al. | 375/267 |
| 2003/0050089 A1* | 3/2003 | Ogino et al. | 455/552 |
| 2003/0125078 A1* | 7/2003 | Hong | 455/556 |
| 2003/0153279 A1* | 8/2003 | Kang et al. | 455/83 |
| 2003/0235167 A1* | 12/2003 | Kuffner | 370/335 |

FOREIGN PATENT DOCUMENTS

| | | |
|---|---|---|
| JP | 7-254816 | 10/1995 |
| JP | 9-130293 | 5/1997 |
| JP | 10-154947 | 6/1998 |
| JP | 11-55156 | 2/1999 |
| JP | 2000-278168 | 10/2000 |
| JP | 2001-251232 | 9/2001 |
| JP | 2001-284943 | 10/2001 |
| JP | 2003-101475 | 4/2003 |
| JP | 2003-188763 | 7/2003 |

OTHER PUBLICATIONS

Translation of Japanese Office Action for Application No. 2003-327110 Mailed Oct. 11, 2006.

Japanese Office Action issued in corresponding Japanese Patent Application No. JP 2003-327110, dated Oct. 17, 2006.

Chinese Office Action dated Sep. 9, 2006.

"GaAs MMIC Application Circuits" http://www.nir.co.lp/108/sgl.02.htm. pp. 1-6.

* cited by examiner

FIG.1A
FIG.1B
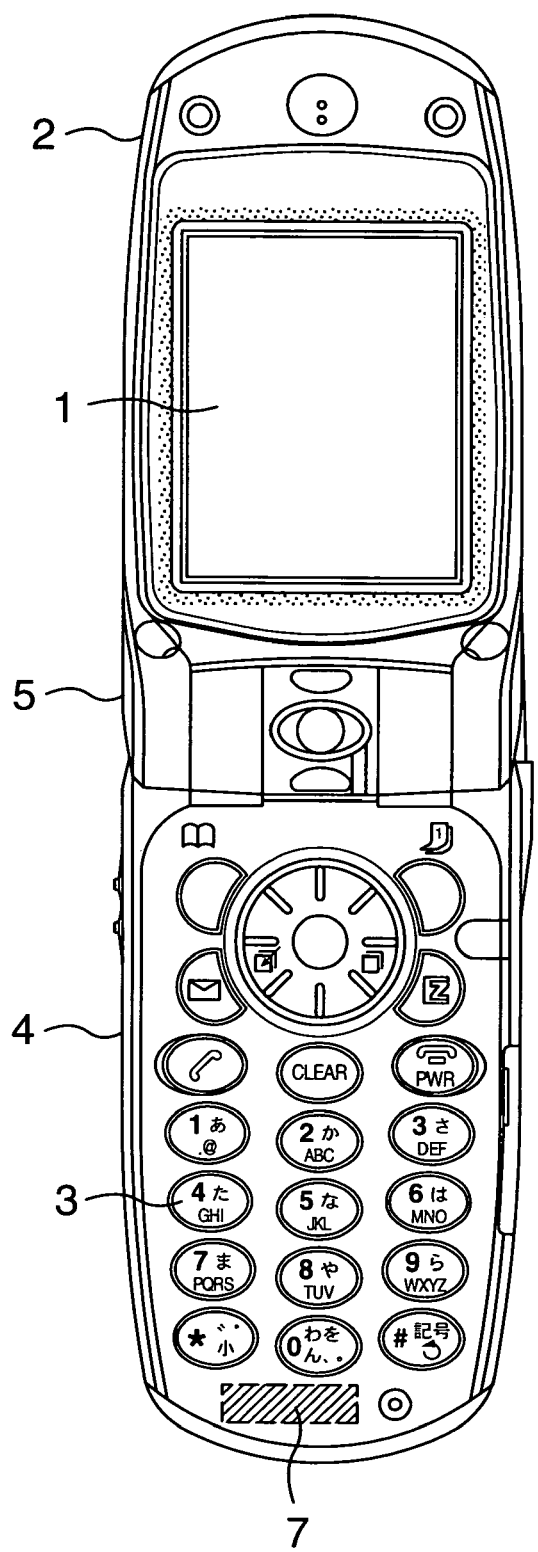
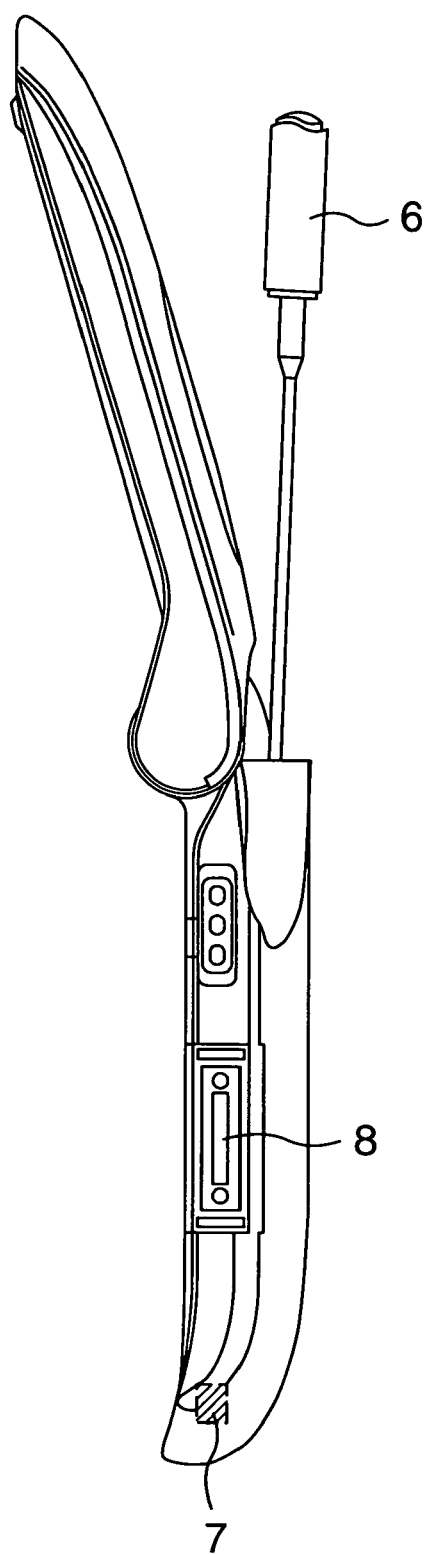

FIG.4

| OPERATION MODE | CONN DTEN | ANTENNA SWITCH A | | ANTENNA SWITCH B | |
|---|---|---|---|---|---|
| | | SW1,SW2 | SW3,SW4 | SW5,SW6 | SW7,SW8 |
| GPS RECEPTION(ANT A) | NO | OFF | ON | OFF | ON |
| NOT IN USE | NO | OFF | ON | ON | OFF |
| GPS RECEPTION(ANT B) | NO | ON | OFF | OFF | ON |
| VOICE/DATA COMM | NO | ON | OFF | ON | OFF |
| RECP CIRC B MONITOR | YES | OFF | ON | OFF | ON |
| TRANS/RECP CIRC MONITOR | YES | OFF | ON | ON | OFF |
| NOT IN USE | YES | ON | OFF | OFF | ON |
| GPS RECP CIRC MONITOR | YES | ON | OFF | ON | OFF |

FIG.6

| OPERATION MODE | CONN DTEN | SW11 | SW12 | SW13 | SW14 | SW15 | SW16 |
|---|---|---|---|---|---|---|---|
| VOICE/DATA COMM | NO | ON | ON | ON | OFF | OFF | OFF |
| GPS RECP(ANT A) | NO | OFF | OFF | ON | ON | ON | OFF |
| NOT IN USE | NO | ON | OFF | OFF | OFF | OFF | ON |
| GPS RECP CIRC MONITOR | YES | ON | ON | ON | OFF | OFF | OFF |
| TRANS/RECP CIRC MONITOR | YES | OFF | OFF | ON | ON | ON | OFF |
| RECP CIRC B MONITOR | YES | ON | OFF | OFF | OFF | OFF | ON |

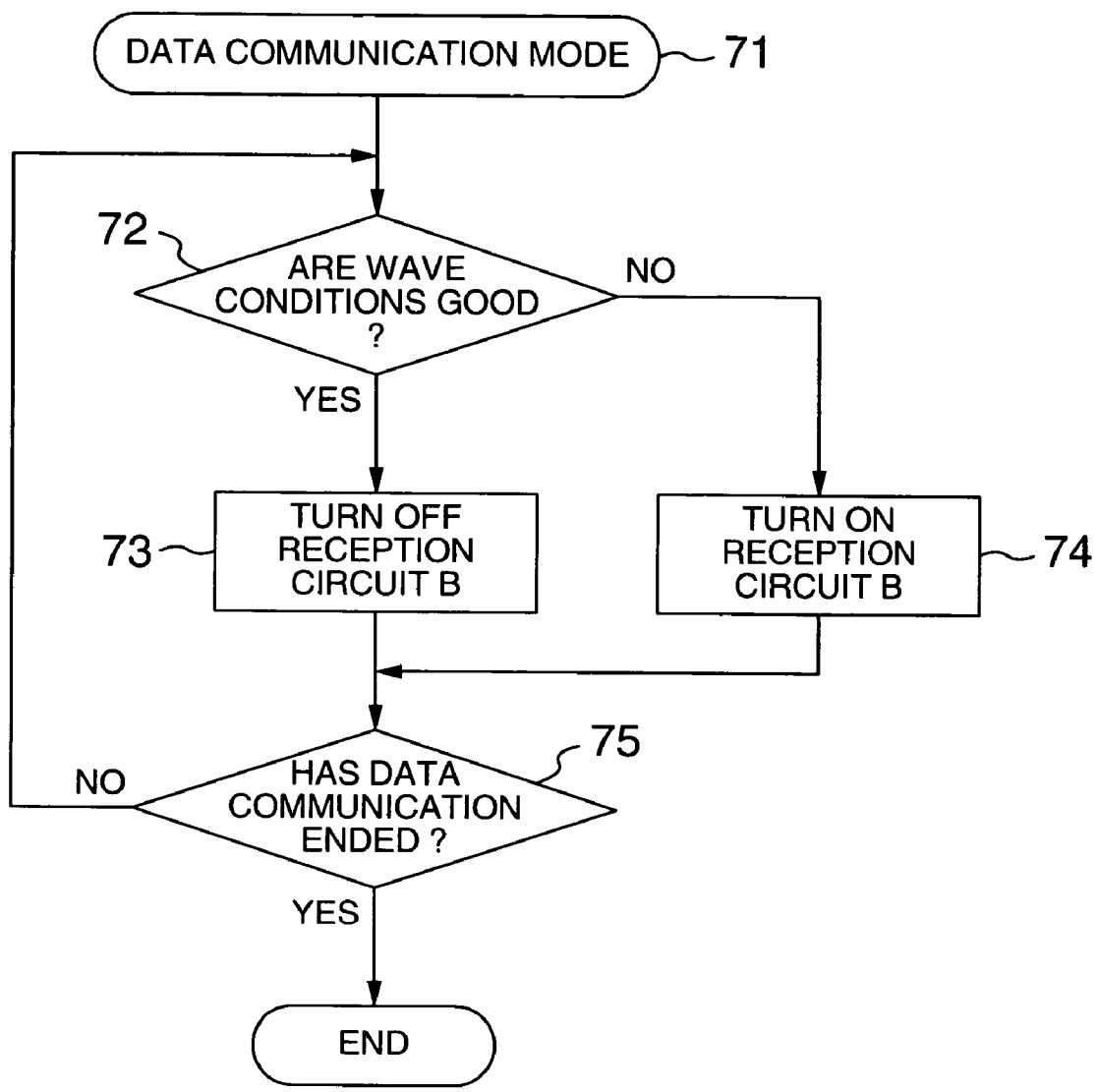

MOBILE TERMINAL

INCORPORATION BY REFERENCE

This application claims priority from Japanese application JP2003-327110 filed on Sep. 19, 2003, the content of which is hereby incorporated by reference into this application.

BACKGROUND OF THE INVENTION

1. Field of the Invention

This invention relates to a mobile terminal and more particularly to a technology for switching connections between an antenna unit and a transmission-reception circuit or respective receiving circuits.

2. Description of the Prior Art

With the current cell phones, the connections between a transmission-reception circuit and a GSP reception circuit, and an antenna and an external monitor terminal are changed over by a switch unit. In the prior art of the switch unit, the switch unit is structured as follows. Four on-off switches are used in such a way that when signals are transmitted and received, the antenna unit is connected to the transmission-reception circuit, and when a GSP signal is received, the antenna unit is connected to the GPS reception circuit, and when an outside antenna is connected or the performance of the transmission circuit and reception circuit is evaluated, the external monitor terminal is connected to the transmission circuit or the reception circuit, which is to be evaluated.

SUMMARY OF THE INVENTION

Lately, mobile terminals fitted with a camera function are gaining popularity among people who want to send image data to friends to share the joy of looking at the same picture together. The volume of image data is generally large, and therefore its transmission and reception takes time. For this reason, there has been demand for a large increase in the transmission rate in transmission and reception.

Meanwhile, to improve the reception performance and obtain stable reception even when the conditions for received radio waves are aggravated due to the surrounding circumstances, it is a general practice to provide two antennas to obtain a better reception performance. In the space diversity as one of techniques of diversity, two antennas and two reception circuits are used to obtain a synthesized signal after received signals are demodulated, to achieve stable reception. Moreover, in the case of a CDMA system, one of its effects is that it is possible to increase the transmission rate by synthesizing signals after they are demodulated.

As described above, to enlarge the transmission rate to achieve stable reception unaffected by adverse radio-wave conditions, it is necessary to provide a switch unit to connect the transmission-reception circuit, the GPS reception circuit, and the reception circuit for space diversity to the two antennas and the external monitor terminal.

However, in the prior art, no consideration was given to the switch unit when the reception circuit for the space diversity and the antennas are added, so that there is a problem that the antenna cannot be connected optimally to the reception circuits.

Furthermore, another problem is that one external monitor terminal cannot be optimally connected to the transmission-reception circuit, the GPS reception circuit or the reception circuit for space diversity.

Because the cell phone is driven by battery, it is important to reduce power consumption.

In data communication, as the amount of information transmitted is large, it is necessary to constantly use two reception circuits to increase the transmission rate. On the other hand, in voice communication, as the amount of information transmitted is small, it is possible to handle information by one reception circuit. However, in the prior art, because no consideration was given to controlling the power supply to one of the two reception circuits, so that it is not possible to reduce power consumption and, as a result, the battery runs down quickly.

The object of this invention is to provide a mobile terminal which can adequately change over connections between the main antenna and the external monitor terminal and the transmission-reception circuit, and between the sub antenna and the reception circuit newly added for space diversity according to the operation modes in the GPS-compatible mobile terminal.

To solve the above problem, according to this invention, a mobile terminal, which includes a first antenna for radio communication; a transmission-reception circuit to exchange signals with a base station through the first antenna; and a GPS reception circuit to receive signals from the GPS satellite through the first antenna, comprises a reception circuit for receiving signals from the base station; a reception circuit for receiving signals from the base station; a second antenna different from the first antenna; and a switch unit for changing over connections to the first antenna, the second antenna, the transmission-reception circuit, the GPS reception circuit, and the reception circuit according to modes of operation.

Thus, the two antennas can be connected optimally to the transmission-reception circuit, the GPS reception circuit, and the reception circuit for space diversity according to the modes of operation.

The mobile terminal comprises an external monitor terminal and a connection detecting unit to detect that the connector is connected to the external monitor terminal, wherein when the connection detecting unit detects that the connector is connected and a specified operation is executed and, as a result, the external terminal mode becomes effective, the switch unit changes over the connection of the external monitor terminal to the transmission-reception circuit, the GPS reception circuit or the reception circuit according to the modes of operation.

Thus, the one external monitor terminal can be optimally connected to the transmission-reception circuit, the GPS reception circuit and the reception circuit for space diversity.

The mobile terminal comprises a power supply control unit for tuning off the power supply to the reception circuit, wherein when the operation mode is voice communication, the power supply to the reception circuit is turned off by the power supply control unit.

By the above arrangements, energy saving can be achieved by turning off the power supply to the reception circuit for space diversity during voice communication in which a small amount of voice data is exchanged.

According to this invention, a GPS-compatible mobile terminal comprises a change-over unit for changing over connections between the main antenna and the external monitor terminal, and the transmission-reception circuit and the GPS reception circuit, and a connection between the sub antenna and the reception antenna newly added for space diversity according to modes of operation, wherein their connections can be optimized by changing them over according to modes of operation. Furthermore, by turning off the power supply to the reception circuit during voice communication, power consumption can be reduced.

This invention provides a mobile terminal in which the connections of the switches are optimized.

Other objects, features and advantages of the invention will become apparent from the following description of the embodiments of the invention taken in conjunction with the accompanying drawings.

BRIEF DESCRIPTION OF THE DRAWINGS

FIGS. 1A and 1B show the external appearance of a CDMA-system cell phone according to one embodiment of this invention.

FIG. 4 is a switch control table showing the states of control of the change-over switches in respective operation modes according to the first embodiment of this invention.

FIG. 6 is a switch control table showing the states of control of the change-over switches in respective operation modes according to the second embodiment of this invention.

FIG. 7 is a flowchart of the process steps of power saving control in the data communication mode according to a third embodiment of this invention.

DESCRIPTION OF THE EMBODIMENTS

Figure 2:
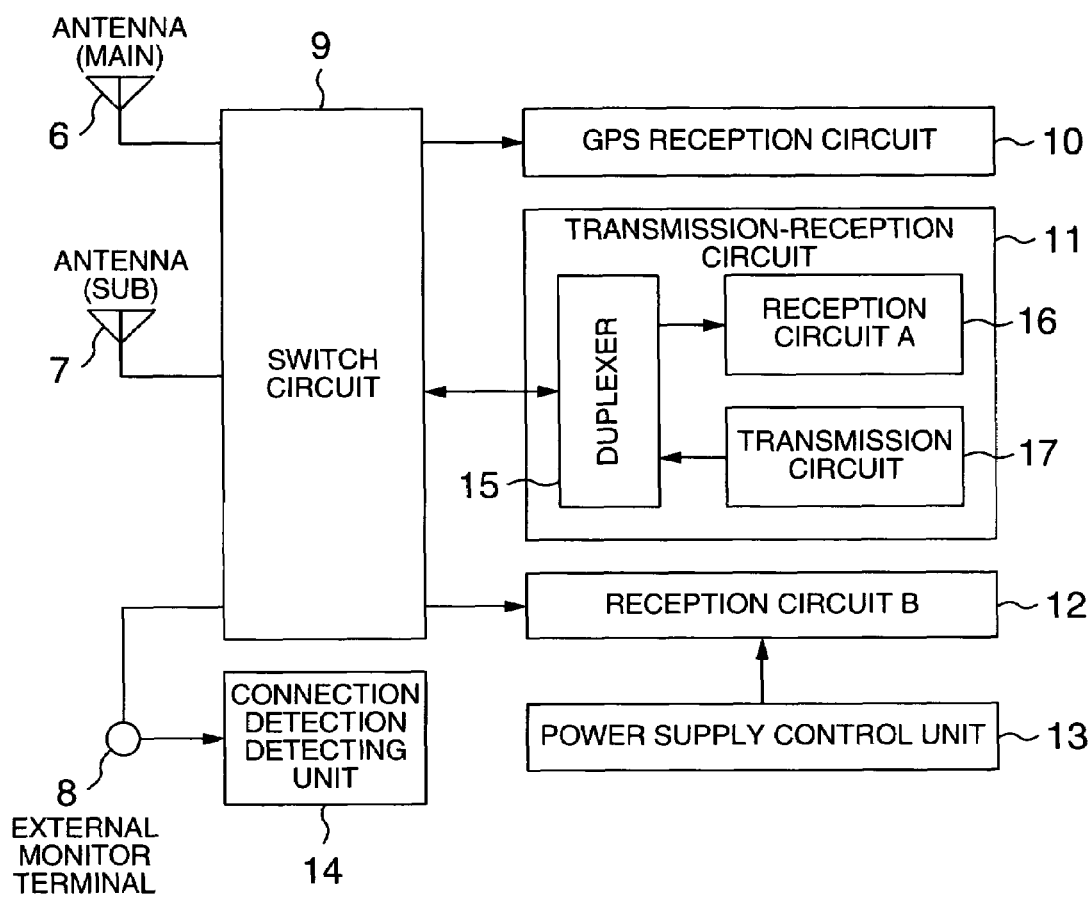
FIG. 2 is a construction diagram of the reception block in the cell phone according to one embodiment of this invention.

Embodiments of the present invention will be described with reference to FIGS. 1 to 7. In the following embodiments, the CDMA-system cell phones will be described as examples, but this invention is not limited to these specific embodiments. The transmission system may be TDMA, for example, other than CDMA, and besides cell phones, mobile terminals supporting voice communication may be used. Note, however, that the following embodiments are particularly suitable for mobile phones compatible with both the voice communication mode, in which a relatively small amount of data is used, and the data communication mode, in which the amount of data is likely to be large.

A first embodiment of this invention will be described with reference to FIGS. 1 to 4. FIG. 1A is an external view drawing, viewed from the front, of a CDMA-system cell phone in the present invention (hereafter referred to as a cell phone). FIG. 1B shows an embodiment of the external appearance as viewed from the side, of the cell phone in this invention. A casing 2 with a display 1 formed by a liquid crystal panel and a casing 4 with operation buttons 3 can be opened and closed at a hinge 5. At the hinge 5 side of the casing 4, an antenna A 6 is retractably mounted as the main antenna to transmit and receive CDMA-system signals and to receive GPS signals. Inside the casing 4, an antenna B 7 is disposed as the sub antenna to receive CDMA-system signals and GPS signals. Moreover, at one side of the casing 4, an external monitor terminal 8 is provided to connect an outside antenna or to evaluate the transmission circuit and the reception circuits as the internal circuits. Normally, with the cell phone as shown in FIGS. 1A and 1B, the user operates the operation buttons 3 to transmit or receive data or talk on the phone. When connecting an outside antenna to the external monitor terminal, information can be transmitted or received via this outside antenna, and also when evaluating the performance of the transmission circuit or the reception circuits by transmitting or receiving signals used in radio communication through the external monitor terminal 8, the performance of the circuit as an evaluation object can be evaluated.

Next, the structure of the cell phone in this invention and the flow of signals will be described with reference to FIG. 2. FIG. 2 is a construction diagram of the reception block of the cell phone in this invention. Numeral 6 designates an antenna A as the main antenna to transmit or receive a CDMA-system signal or to receive a GPS signal; 7 designates an antenna B as the sub antenna to receive a CDMA-system signal or to receive a GPS signal; 8 designates an external monitor terminal to connect an outside antenna and evaluate the performance of the CDMA-system transmission-reception circuit, the GPS reception circuit, and the reception circuit for space diversity; 9 designates a switch circuit to change over the connections between the antennas A 6 and B 7 and the external monitor terminal 8, and the internal circuits, such as the GPS reception circuit, the transmission-reception circuit, and the reception circuit B according to operation modes; 10 designates a GPS reception circuit to receive signals from the GPS satellite; 11 designates a transmission-reception circuit to transmit or receive CDMA-system signals; 12 designates a reception circuit B for space diversity; 13 designates a power supply unit to control power supply to the reception circuit B 12; and 14 designates a connection detecting unit to detect that the connector is connected to the external monitor terminal 8. The transmission-reception circuit includes a duplexer 15 guides a received signal from the antenna A 6 to the reception circuit A 16, and guides a signal from the transmission circuit 17 to the antenna A 6.

In the cell phone, a control unit is also provided (not shown) to control the switch circuit 9, the GPS reception circuit 10, the transmission-reception circuit 11, the reception circuit B 12, the power supply unit 13, and the connection detecting unit 14. The control unit decides on modes of operation and controls the whole of the cell phone.

Description will be made of connections in operation mode and the flow of signals.

When the voice mode or data communication mode by CDMA system is specified by a prescribed operation, such as pressing the talk button, the antenna A 6 is connected to the transmission-reception circuit 11, so that through the antenna A 6, a transmitting signal is sent out from the transmission circuit and a CDMA-system receiving signal is received at the reception circuit A 16. At the same time, the antenna B 7 is connected to the reception circuit B 12, and through the antenna B 7, a CDMA-system receiving signal is received by the reception circuit B 12. Signals of the reception circuits B 12 and A 16, after being demodulated, are synthesized to thereby stabilize reception and increase the transmission rate. During voice communication, the power supply control unit 13 is implemented to turn off the power supply to the reception circuit B 12 to thereby save power consumption.

When the GPS reception mode is set to receive a GPS signal from the GPS satellite, which is utilized to obtain position information by a position search operation, the antenna A 6 is connected to the GPS reception circuit 10 and a GPS signal is received, in this case, by using the antenna B 17. In this embodiment, it is arranged that the antenna B 7 can be connected to the GPS reception circuit 10, a unit is provided (not shown) for detecting the field intensity of the antennas A 6 and B 7, and according to the detected field intensity, the antenna A 6 and the antenna B 7 can be switched over to obtain a stable receiving operation. When the antenna B 7 is not used to secure a GPS reception frequency band but a GPS signal is received only by the antenna A 6, this makes it possible to reduce the size of the antenna B 7 so that the size of the mobile phone can be further reduced.

Next, description will be made of a case where information is sent and received by an outside antenna, which is connected to the external monitor terminal 8. To put the outside antenna in a working condition, when a connector fastened to the outside antenna is connected to the external monitor terminal 8, the external terminal mode is entered. When the voice/data communication mode by CDMA system is made effective by a specified operation, the external monitor terminal 8 is connected to the transmission-reception circuit 11, a signal is transmitted from the transmission circuit 17 and a CDMA-system receiving signal is received by the reception circuit A 16 by using the outside antenna as the main antenna. At the same time, the antenna B 7 is connected to the reception circuit B 12, and through this antenna B 7, a CDMA signal is received by the reception circuit B 12, and signals of the reception circuits B 12 and A 16, after being demodulated, are synthesized to thereby stabilize reception and increase the transmission rate. When the GPS reception mode is set to receive GPS signal from the GPS satellite by performing a specified operation, the external monitor terminal 8 is connected to the GPS reception circuit 10, and GPS signals are received through the outside antenna used as the main antenna.

Description will now be made of evaluation of the internal circuits by using the external monitor terminal 8. The procedure to enter the evaluation state is as follows. The user connects the connector to the external monitor terminal 8, and then selects the external terminal mode from the menu and also selects a circuit to be evaluated, by which the evaluation mode becomes effective for the transmission circuit and the reception circuits as the internal circuits of the cell phone. When evaluating the GPS reception circuit 10, a GPS signal input from the external monitor terminal 8 is received at the GPS reception circuit 10, and from reception results, its performance is evaluated. When evaluating the transmission-reception circuit 11, a CDMA-system signal input from the external monitor terminal 8 is received at the reception circuit A 16, and a transmitting signal from the transmission circuit 17 is obtained from the external monitor terminal 8, and from reception results, the performance of the transmission-reception circuit 11 is evaluated. When evaluating the reception circuit B 12, a CDMA-system signal input from the external monitor terminal 8 is received, and from reception results, its performance is evaluated.

Particulars of change-over switches and change-over control of operation modes in the switch circuit 9 will next be described in detail with reference to FIGS. 3 and 4.

Figure 3:
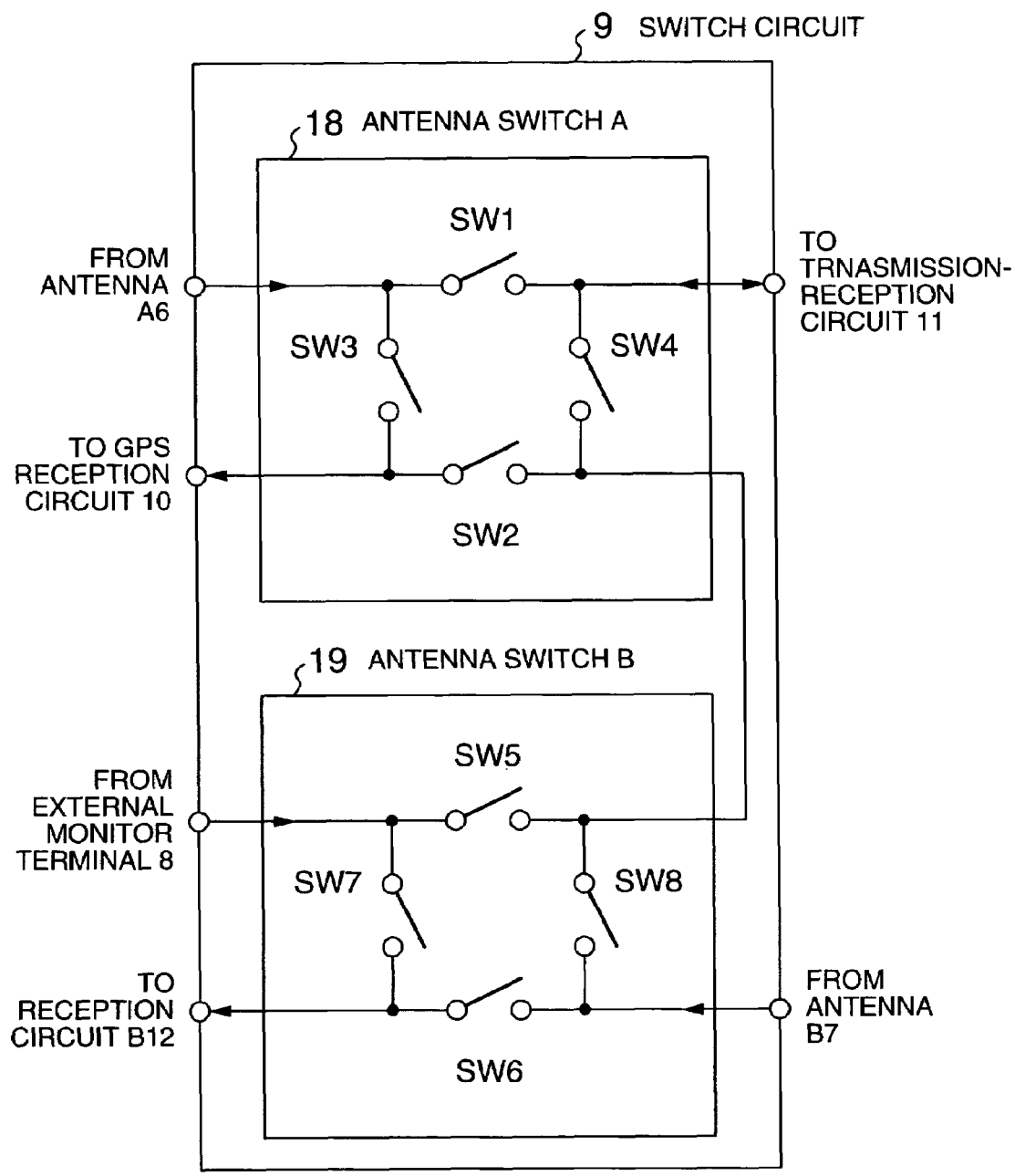
FIG. 3 is a detailed circuit diagram of change-over switches in the switch circuit 9 according to a first embodiment of this invention.

FIG. 3 is detailed circuit diagram of change-over switches in the switch circuit 9 according to a first embodiment of this invention. FIG. 4 is a switch control table showing states of control of the change-over switches in the operation modes according to the first embodiment of this invention. In changing over the switches, the four control lines are laid out so that switches SW1 and SW2 are in a converse relation to switches SW3 and SW4, and that switches SW5 and SW6 are also in a converse relation to switches SW7 and SW8, with a view to realizing shared use of the switches and controlling the switches virtually by two bits. The operation states of the switches are made common whether the connector is connected or not, with the result that on-off combinations of those switches are only four kinds.

Because it is possible to realize this arrangement by using two pieces of general-purpose DPDT (Dual Pole Double Throw) switches, the switches can be controlled by two bits, and this makes it possible to save power consumption and decrease load on the control process.

Description will start with an ordinary working condition in which the connection detecting unit 14 is not detecting the connector which is connected.

In the GPS reception mode, when a GPS signal from the GPS satellite is received (antenna A), switches SW3 and SW4 of the antenna switch A 18 are in on state and therefore the GPS signal received by the antenna A 6 is supplied through the switch SW3 to the GPS reception circuit 10. In GPS reception (antenna B), switches SW1 and SW2 of the antenna switch A 18 and switches SW7 and SW8 of the antenna switch B 19 are in on state and therefore the GPS signal received by the antenna B 7 is supplied through switches SW8 and SW2 to the GPS reception circuit 10. In voice/data communication, because switches SW1 and SW2 are in on state, a CDMA-system signal received by the antenna A 6 is supplied through switch SW1 to the transmission-reception circuit 11, and also because switches SW5 and SW6 of the antenna switch B 19 are in on state, a CDMA-system signal received by the antenna B 7 is supplied through switch SW6 to the reception circuit B 12. In voice communication, by turning off the power supply to the reception circuit B 12, power consumption can be reduced.

Description will be made of the external connection mode in which the connection detecting unit 14 is detecting that the connector is connected. Description will first deal with transmission and reception when the outside antenna is connected. When the voice/data communication mode by CDMA system is set up, the operation mode of "transmission-reception circuit monitor" becomes effective, because in this operation mode, switches SW3 and SW4 of the antenna switch A 18 and switches SW5 and SW6 of the antenna switch B 19 are in on state, a CDMA-system signal input from the external monitor terminal 8 is supplied through switches SW5 and SW4 to the reception circuit A 16, and a transmitting signal from the transmission circuit 17 is supplied through switches SW4 and SW5 to the external monitor terminal 8, and also a CDMA-system signal input from the antenna B 7 is supplied through switch SW6 to the reception circuit B 12. When the GPS reception mode is set up, the operation mode "GPS reception circuit monitor" becomes effective, and because switches SW1 and SW2 of the antenna switch A 18 and switches SW5 and SW6 of the antenna switch B 19 are in on state, a GPS signal input from the external monitor terminal 8 is supplied through switches SW5 and SW6 to the GPS reception circuit 10.

Description will be made of operations when evaluating the transmission-reception circuit 11 as an internal circuit. When monitoring the reception circuit B 12, because switches SW7 and SW8 of the antenna switch B 19 are in on state, a CDMA-system signal input from the external monitor terminal 8 is supplied through switch SW7 to the reception circuit B 12. When monitoring the transmission-reception circuit 11, because switches SW3 and SW4 of the antenna switch A 18 and switches SW5 and SW6 of the antenna switch B 19 are in on state, a CDMA-system signal input from the external monitor terminal 8 is supplied through switches SW5 and SW4, and a transmitting signal from the transmission circuit 17 is supplied through switches SW4 and SW5 to the external monitor terminal 8. When monitoring the GPS reception circuit 10, because switches SW1 and SW2 of the antenna switch A 18 and switches SW5 and SW6 of the antenna switch B 19 are in on state, a GPS signal input from the external monitor terminal 8 is supplied through switches SW5 and SW2 to the GPS reception circuit 10.

As described above, by forming the switch circuit 9 in the circuit structure as shown in the first embodiment, eight switches are changed over by not eight control lines but four control lines laid out so that switches SW1 and SW3 are in a converse relation to switches SW3 and SW4 and that switches SW6 and SW7 are in a converse relation to switches SW7 and SW8, and this circuit structure ensures that the switches can be controlled virtually by two bits and therefore the required space can be made as small as possible. Furthermore, eight kinds of operation modes can be realized by four kinds of switch on-off combinations, so that the process load on the control unit can made smaller. Because this arrangement can be realized by two general-purpose DPDT switches, the switches can be controlled by two bits and space savings and a reduction of the control process load can achieved. In this manner, the antenna A 6, the antenna B 7, and the external monitor terminal 8 can be connected optimally to the GPS reception circuit 10, the transmission-reception circuit 11, and the reception circuit B 12 according to the operation modes. When talking on the phone, the power supply to the reception circuit B 12 can be turned off to save power consumption.

Figure 5:
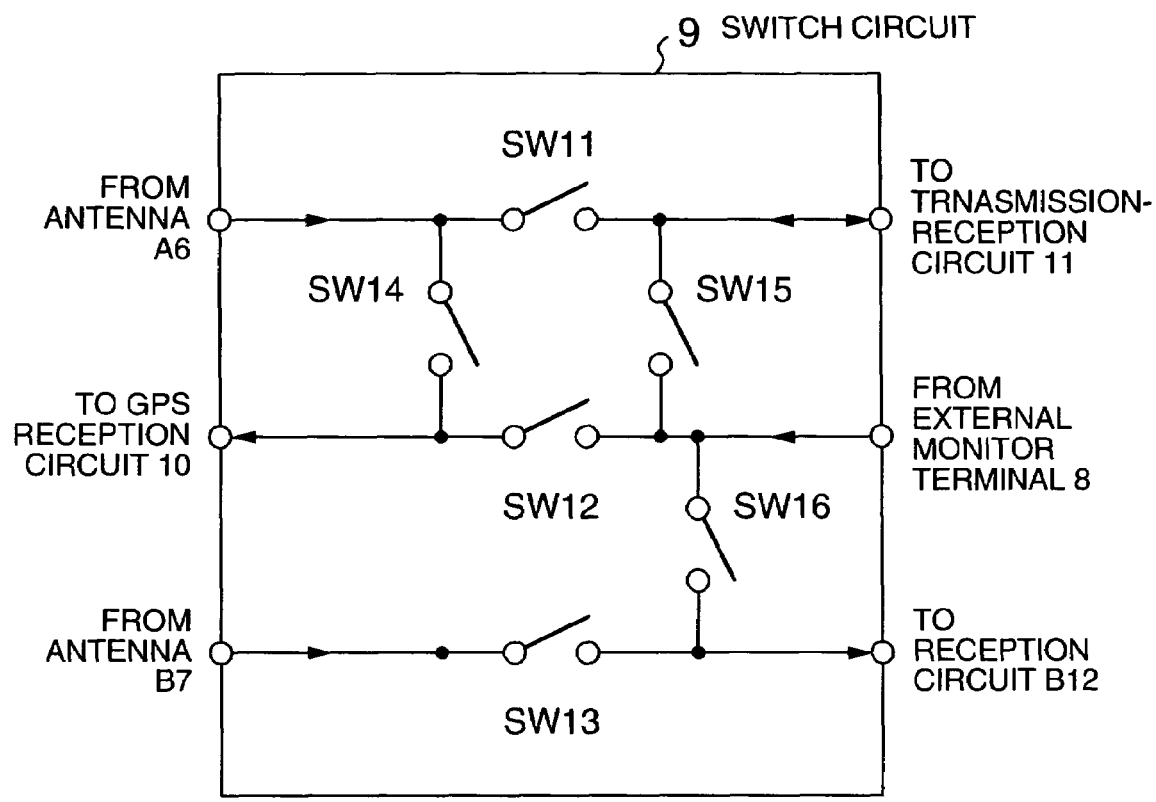
FIG. 5 is a detailed circuit diagram of change-over switches in the switch circuit 9 according to a second embodiment of this invention.

Referring to FIGS. 5 and 6, description will be made of particulars of change-over switches and change-over control of operation modes in the switch circuit 9 according to a second embodiment of the present invention. FIG. 5 is a detailed circuit diagram of change-over switches in the switch circuit 9 according to the second embodiment of this invention. FIG. 6 is a switch control table showing the states of control of the change-over switches according to the operation modes in the second embodiment of this invention. In this embodiment, the antenna B 7 is downsized so as to correspond to a signal bandwidth used in the CDMA system, and six switches are changed over by using six control lines. The change-over states of the switches are made common whether the connector is connected or not, and can be realized by three kinds of on-off combinations.

Description will start with an ordinary working condition in which the connection detecting unit 14 is not detecting the connection of the connector. In voice/data communication, because switches SW11, SW12 and SW13 are in on state, a CDMA-system signal received by the antenna A 6 is supplied through switch SW11 to the transmission-reception circuit 11, and at the same time a signal received by the antenna B 7 is supplied through switch SW13 to the reception circuit B 12. When receiving a GPS signal (antenna A) from the GPS satellite, because switches SW13, SW14 and SW15 are in on state, a GPS signal received by the antenna A 6 is supplied through switch SW14 to the GPS reception circuit 10.

Description will be made of the state of external connection mode, in which the connection detecting unit 14 is detecting that the connector is connected. Description will start with transmission and reception when the outside antenna is connected. When "data communication/reception" or "voice communication" by CDMA system is set, the operation mode "transmission-reception circuit monitor" becomes effective, and because in this operation mode switches SW13, SW14 and SW15 are in on state, a CDMA-system signal input from the external monitor terminal 8 is supplied through switch SW15 to the reception circuit A 16 and a signal from the transmission circuit 17 is supplied through switch SW15 to the external monitor terminal 8, and at the same time a CDMA-system signal input from the antenna B 7 is supplied through switch SW13 to the reception circuit B 12. When "GPS reception" is set, the operation mode "GSP reception circuit monitor" becomes effective, because in this operation mode switches SW11, SW12 and SW13 are in on state, a GPS-system signal input from the external monitor terminal 8 is supplied through switch SW12 to the GPS reception circuit 10.

Description will be made of operations when evaluating the transmission circuit and the reception circuits as the internal circuits. In the operation mode "GPS reception circuit 10 monitor", because switches SW11, SW12 and SW13 are in on state, a GPS signal input from the external monitor terminal 8 is supplied through switch SW12 to the GPS reception circuit 10. In the operation mode "transmission-reception circuit 11 monitor", because switches SW13, SW14 and SW15 are in on state, a CDMA-system signal is supplied through switch SW15 to the reception circuit A 16 and a signal from the transmission circuit 17 is supplied through switch SW15 to the external monitor terminal 8. In the operation mode "reception circuit B 12 monitor", because switches SW11 and SW16 are in on state, a CDMA-system signal input from the external monitor terminal 8 is supplied through switch SW16 to the reception circuit B 12.

As described above, as the switch circuit 9 is formed in a circuit structure as shown in the second embodiment, only six pieces of change-over switches are required, which means that a reduction of space can be achieved, and the six kinds of operation modes can be realized by three kinds of switch on-off combinations, which means that the process load on the control unit can be decreased. The optimized layout of connections and the use of smaller number of switch on-off combinations as well as the size-reduced antenna B 7 contribute to the lessening of process load on the control unit. In short, this invention opens the way for reducing the size of the cell phones and their production cost.

Referring to FIG. 7, description will be made of power-saving control in the data communication mode according to a third embodiment of this invention. FIG. 7 is a flowchart showing the flow of process steps in power saving control in the data communication mode according to a third embodiment of this invention. When the transmission mode is set by executing a specified operation (Step 71), the field intensity, for example, is monitored and compared with a specified value to decide whether the wave conditions are good or not (Step 72). When the wave conditions are good, by a decision that a desired transmission rate can be secured by a signal from the antenna A 6 as the main antenna, the power supply control unit 13 is driven to turn off the power supply to the reception circuit 12 to save power consumption. When the wave conditions are adverse in Step 72, a decision is made that the desired transmission rate cannot be secured only by the main antenna, the power supply to the reception circuit B 12 is kept on (Step 74). Subsequently, in Step 75, a decision is made whether the data communication mode has ended, and when it ended, this process is terminated. When the data communication mode is not ended, the process returns to Step 72, the wave condition is monitored, and according to monitor results, the power supply control unit is operated to turn off or keep the power on. By this process, when the wave condition is good and a high transmission rate can be secure in the data communication mode, the power supply to the reception circuit B 12 is turned off to save power consumption.

Meanwhile, the specified value mentioned above as the criterion for making a decision in Step 72 is determined as follows. In CDMA2000 1×V–DO, when the field intensity is high, a high transmission rate can be secured, and as the field intensity goes down, the transmission rate decreases. This is the reason why when the field intensity is low, a received signal from the sub antenna is used to synthesize it with a signal from the main antenna to thereby increase the transmission rate. Because there is correlation between the field intensity of the main antenna and the transmission rate, a field intensity is determined which is necessary to secure a transmission rate that the user wants to obtain, and this value is taken as a specified value as the criterion for decision in Step 72. Note that a desired transmission rate can be set by the user pressing the manual operation button 3. Moreover, the data communication rate may be calculated based on the amount of data to be sent or received.

In this embodiment, though the wave condition is used as the criterion for making a decision in Step 72 in this embodiment, some other criterion may be substituted. For example, the remaining battery charge may be used as the criterion for decision, and the power supply to the reception circuit B 12 may be turned off when the remaining charge is low. By so doing, when the remaining charge of the battery is low, power consumption can be reduced to prolong the working time.

The on-off operation of the reception circuit B can be set by the user. Thus, it is possible for users who do not use data communication to have the reception circuit B 12 constantly turned off, and this saving of power consumption extends the working time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mobile terminal comprising:
   a first antenna for radio communication;
   a second antenna for an operation different from the first antenna;
   a transmission-reception circuit configured to transmit and receive signals to and from a base station through the first antenna;
   a GPS reception circuit configured to receive signals from a GPS satellite through the first antenna or the second antenna;
   a diversity reception circuit for receiving the signals from the base station through the second antenna;
   an external terminal for connecting an external antenna thereto;
   a power supply control unit for turning off power supply to the diversity reception circuit; and
   a switch unit configured to selectively switch each of the first antenna and the second antenna, between the transmission-reception circuit, the GPS reception circuit, and the diversity reception circuit according to an operation mode of the mobile terminal including a communication mode and a GPS reception mode, wherein:

the switch unit switches the transmission-reception circuit to couple to the first antenna and switches the diversity reception circuit to couple to the second antenna when the communication mode is set to communicate with the base station, the switch unit switches the GPS reception circuit to couple to the first antenna or to the second antenna when the GPS reception mode is set to receive signals from the GPS satellite, the communication mode includes a data communication mode and a voice communication mode, and the power supply control unit turns off the power supply to the diversity reception circuit when the communication mode is set to the voice communication mode;

the transmission-reception circuit, the GPS reception circuit and the diversity reception circuit concurrently exist in the terminal at the same time;

when the external antenna is connected to the external terminal, the switch unit switches the transmission-reception circuit to couple to the external antenna instead of the first antenna during the communication mode, and switches the GPS reception circuit to couple to the external antenna instead of the first antenna or the second antenna during the GPS reception mode; and when the external antenna is connected to the external terminal, a performance of the transmission-reception circuit is evaluated by using the signals transmitted to and received from the base station by the transmission-reception circuit, and a performance of the GPS reception circuit is evaluated by using the signals received from the GPS satellite by the GPS reception circuit.

* * * * *